Patented Feb. 6, 1945

2,368,767

UNITED STATES PATENT OFFICE 2,368,767

ADHESIVE COMPOSITION

Malcolm C. Moore, Wilmington, Del., assignor to Hercules Powder Company, Wilmington, Del., a corporation of Delaware No Drawing. Application February 20, 1941, Serial No. 379,839

14 Claims. (Cl. 260—8)

This invention relates to adhesive compositions and more particularly to adhesive compositions containing water-soluble film-forming materials.

Water-soluble film-forming materials such as starch, sugars, protein materials as casein, animal glue, gelatin, etc., find wide usage commercially in adhesive applications. When used alone, these water-soluble film-forming adhesive materials usually provide films which are too brittle for many uses, which are too water sensitive, and which are deficient in adhesive characteristics for providing satisfactory adhesion to non-porous surfaces. It has been customary to plasticize such adhesive materials by means of hygroscopic plasticizing agents such as glycerine, aliphatic alcohols, sugar alcohols, sulfonated oils, alkylolamines, and the like. Such plasticizers promote the absorption of water and the absorbed water serves as a plasticizing agent for the film-forming adhesive ingredient. While such plasticizers may be satisfactory for some applications of the adhesive compositions, they are undesirable for other applications for several reasons. They reduce the internal adhesive strength of the film-forming ingredients with a resulting decrease in the binding action of the adhesive composition. They do not contribute to the adhesive characteristics of the film-forming ingredient and usually increase the water sensitivity of the adhesive.

It is an object of this invention to provide improved plasticized adhesive compositions containing water-soluble film-forming materials as adhesive components. It is a further object to provide improved plasticizers for water-soluble film-forming materials which overcome the above disadvantages of the plasticizers which have been used heretofore. Other objects of the invention will appear hereinafter.

The above objects may be accomplished in accordance with this invention by use of a polymerized terpene having a drop melting point up to about 80° C. as a plasticizer for water-soluble film-forming materials. It has been found that polymerized terpenes of the above characteristics in addition to plasticizing the water-soluble film-forming materials reduce their water sensitivity, increase their adhesive qualities, and improve their wetting power. The use of such improved plasticizers therefore makes it possible to utilize water-soluble film-forming materials in a highly improved manner in the adhesive field.

The water-soluble film-forming materials which are effectively plasticized by the improved plasticizers in accordance with this invention comprise the general class of materials used in the trade as the base of water-soluble adhesive compositions and include such materials as starches, sugars, protein materials as casein, soy bean flour, animal glue, gelatin, and the like.

The polymerized terpenes which have been found to provide the desirable plasticizing properties utilized in this invention include the resinous materials obtained by polymerization of terpenes, for example, alpha pinene, beta pinene, dipentene, limonene, terpinene, terpinolene, allo-ocimene, etc., in the presence of catalytic materials such as aluminum chloride, zinc chloride, boron trifluoride, silica gel, fuller's earth, etc. The polymerized terpenes which are effective in providing the improvements in accordance with this invention are those which are either viscous liquids at ordinary temperatures or soft solids melting up to about 80° C. by the drop method. Preferably, the polymerized terpenes melting at about 35° C. to about 70° C. will be used.

The amount of the polymerized terpene which it will be desirable to incorporate with the water-soluble film-forming ingredient in the adhesive composition will depend on the particular polymerized terpene used and the specific water-soluble film-forming component of the adhesive used. With use of starch, for example, an amount up to about 40% by weight of the polymerized terpene, based on the weight of the starch, will provide the above mentioned improved properties in the adhesive. With protein materials such as casein, an amount of the polymerized terpene up to about 50% by weight of the casein will provide the desired improvement. In general, the amount of polymerized terpene incorporated with the water-soluble film-forming component will fall within the range of about 5% to about 70% by weight of the water-soluble film-forming material and preferably the amount used will fall within the range of about 10% to about 50% of the weight of the water-soluble film-forming ingredient.

The polymerized terpene may be incorporated with the water-soluble film-forming material in an aqueous medium by any suitable procedure, such as by dispersing the polymerized terpene in this medium, or by blending an aqueous dispersion of the polymerized terpene with an aqueous dispersion of the film-forming material, or by adding the polymerized terpene to an aqueous solution of the water-soluble film-forming material and emulsifying the mixture by means of the emulsifying action of the dissolved film-forming material, etc. The polymerized terpene may be dispersed in water in the liquid form or in the form of a solution in an organic solvent by means of a suitable emulsifying agent. Emulsifying agents such as, for example, the alkali metal salts of the higher aliphatic half ester sulfates, as sodium lauryl sulfate, sodium stearyl sulfate, sulfonated oils as sulfonated castor oil, sulfonated olive oil, soaps as sodium stearate, sodium oleate, potassium oleate, alkali metal salts of alkyl naphthalene sulfonic acids, as sodium butyl naphthalene sulfonate, sodium isopropyl naphthalene sulfonate, etc., may be employed.

The use of the improved plasticizers in accordance with this invention makes it possible to provide adhesive compositions having a variety of applications which exhibit a marked improvement over the use of the adhesive compositions without plasticizers or with plasticizers such as have been used in the past. The improved adhesive compositions prepared in accordance with this invention may thus be used in pigmented coating compositions for the printing and coating of paper, textile fabrics, leather, etc., to provide binding action on the pigments. They may be used in cold water paints with proteins such as casein where their binding action provides improved results in the coating of structural materials such as wallboards of either cellulose or mineral origin, plastered surfaces, cemented surfaces, wood, etc. In the production of abrasive papers with use of animal glue as the adhesive to bind the abrasive materials such as silica, silicon carbide, metal dust, the improved plasticizers provide greater adhesive qualities and reduced water sensitiveness. In the production of laminated materials with use of starch as the adhesive, such as in the manufacture of paper cartons, the improved plasticizers provide greater adhesiveness and lowered water sensitivity. The adhesive compositions including the water-soluble film-forming materials plasticized in accordance with this invention will be found to exhibit considerable improvement over the film-forming materials alone or plasticized with the prior hygroscopic plasticizers in many other applications in which the adhesive qualities of the water-soluble film-forming materials are utilized.

As indicated above the adhesive compositions described in accordance with this invention may contain coloring matters such as pigments, mineral fillers such as coating clays or titanium dioxide pigments as well as other materials normally used with water-soluble film-forming adhesive compositions.

As illustrative of the improvement in adhesive compositions provided by this invention the following examples may be cited. In the examples all proportions are by weight unless otherwise indicated.

*Example I*

A polymer produced by treating alpha-pinene with aluminum chloride having a drop melting point of 55° C. and a Lovibond color of 30 Amber was emulsified in water according to the following formula:

| | Parts |
|---|---|
| 80% xylene solution of polymerized alpha-pinene | 86 |
| Sodium lauryl sulfate | 0.68 |
| Oleic acid | 1 |
| Triethanolamine | 0.4 |
| Sulfonated castor oil | 1 |
| Water | 181.62 |

The polymerized alpha-pinene was dissolved in xylene and the xylene solution dispersed in the water containing the dispersing agents. A plasticized adhesive composition was then prepared by blending 5.5 parts of the above dispersion with 56 parts of a casein solution prepared by dissolving 60 parts of casein in 340 parts of water containing 8.4 parts of sodium carbonate at 50° C. The adhesive composition resulting exhibited a high degree of toughness and flexibility and excellent adhesive characteristics. It was used to bond clay to paper by blending 50 parts of the adhesive with 75 parts of a 50% paste of clay in water and applying the mixture to 40 pound unsized paper. The coated paper obtained possessed increased flexibility and reduced dusting in comparison with a paper coated in a similar manner with use of unplasticized casein.

*Example II*

A viscous polymerized dipentene was emulsified in water by dispersing 41.7 parts of an 80% xylene solution of the polymer in 57.97 parts of water containing .33 part of sulfated lauryl alcohol. The emulsion so obtained was then used in preparation of a textile printing paste on the following formula:

| | Parts |
|---|---|
| 10% cornstarch solution | 50 |
| Gum tragacanth solution (6 oz. per gal) | 25 |
| Polymerized dipentene emulsion | 10 |
| 50% titanium dioxide paste | 20 |

The first three components were blended and added to the pigment paste with stirring thereby providing a viscous paste. The paste was printed on a textile fabric using an engraved roll. The printed fabric obtained was characterized by less stiffness and by better adhesion of the pigment than was obtainable with starch and gum tragacanth alone as the binder.

*Example III*

A polymerized allo-ocimene having a melting point of 65–70° C. and a Lovibond color of 40 Amber was dispersed in water according to the formula used in Example II above and 30 parts of the emulsion then added to 100 parts of a casein solution prepared by dissolving 60 parts of casein in 340 parts of water containing 8.4 parts of sodium carbonate at 50° C. The plasticized casein composition so obtained was then used as a grinding medium for 100 parts of a pigment consisting of 70% lithopone, 20% clay and 10% silica. The pigment was ground into the casein composition on a buhrstone mill. The pigmented composition was then diluted to 50% solids content and the paint resulting brushed on a cellulosic wallboard ("Celotex") and also on an asbestos cement wallboard ("Transite"). The coated wallboard was then waterproofed by spraying with a dilute formaldehyde solution. The coated surface after thoroughly drying was resistant to chipping and the film was quite flexible as compared with films obtained with unplasticized casein.

*Example IV*

The same emulsion of polymerized allo-ocimene used in Example III above was used as a plasticizer for animal glue by adding 45 parts of the emulsion to 35 parts of No. 1 grade animal glue dissolved in 65 parts of water at 50–60° C. The plasticized glue solution was then coated by means of rollers on 70 pound unbleached kraft paper to provide approximately 15 pounds of solids per 3000 square feet. Before the coating was dry flint particles of No. 0 grade were evenly applied to the wet coating and the sanded surface then festooned, dried and wound. A top sizing coat was then applied to the sanded surface from a dilute composition prepared by diluting the original solution to 15% solids content. After thoroughly drying the sandpaper produced was characterized by having greater flexibility and decreased water-sensitivity in comparison with sandpaper prepared with use of unplasticized animal glue.

By utilizing polymerized terpenes such as defined above as plasticizers for water-soluble film-forming materials to provide compositions useful in various adhesive compositions, several definite advantages in the use of such film-forming adhesive materials are realized. Thus, in addition to plasticizing the water-soluble film-forming materials, these novel plasticizers reduce their water sensitivity, increase their adhesive qualities, and improve their wetting properties. These novel plasticizers provide a distinct improvement over the hygroscopic plasticizers which have been heretofore used and make it possible to provide improved adhesive compositions based on water-soluble film-forming adhesive materials.

It will be understood that the details and the specific examples are illustrative only and that the invention as herein broadly described and claimed is in no way limited thereby.

What I claim and desire to protect by Letters Patent is:

1. As an adhesive composition, casein plasticized with a polymerized terpene having a melting point up to about 80° C.

2. As an adhesive composition, casein plasticized with a polymerized pinene having a melting point up to about 80° C.

3. An adhesive composition comprising an adhesive film-forming material selected from the group consisting of water-soluble amylaceous materials, water-soluble proteinaceous materials and alkali-soluble proteinaceous materials, and, as a plasticizer, a polymerized terpene having a melting point up to about 80° C.

4. An adhesive composition comprising an adhesive film-forming material selected from the group consisting of water-soluble amylaceous materials, water-soluble proteinaceous materials and alkali-soluble proteinaceous materials, and, as a plasticizer, a polymerized terpene having a melting point within the range of about 35° C. to about 70° C.

5. An adhesive composition comprising an adhesive film-forming material selected from the group consisting of water-soluble amylaceous materials, water-soluble proteinaceous materials and alkali-soluble proteinaceous materials, and, as a plasticizer, a polymerized pinene having a melting point up to about 80° C.

6. An adhesive composition comprising an adhesive film-forming material selected from the group consisting of water-soluble amylaceous materials, water-soluble proteinaceous materials and alkali-soluble proteinaceous materials, and, as a plasticizer, a polymerized dipentene having a melting point up to about 80° C.

7. An adhesive composition comprising an adhesive film-forming material selected from the group consisting of water-soluble amylaceous materials, water-soluble proteinaceous materials and alkali-soluble proteinaceous materials, and, as a plasticizer, a polymerized allo-ocimene having a melting point up to about 80° C.

8. An adhesive composition comprising an adhesive film-forming material selected from the group consisting of water-soluble amylaceous materials, water-soluble proteinaceous materials and alkali-soluble proteinaceous materials, and, as a plasticizer, from about 5% to about 60%, based upon the weight of said material, of a polymerized terpene having a melting point up to about 80° C.

9. An adhesive composition comprising an adhesive film-forming material selected from the group consisting of water-soluble amylaceous materials, water-soluble proteinaceous materials and alkali-soluble proteinaceous materials, and, as a plasticizer, from about 10% to about 40%, based upon the weight of said material, of a polymerized terpene having a melting point within the range of about 35° C. to about 70° C.

10. An adhesive composition comprising an adhesive film-forming material selected from the group consisting of water-soluble amylaceous materials, water-soluble proteinaceous materials and alkali-soluble proteinaceous materials, and, as a plasticizer, a polymerized bicyclic terpene having a melting point up to about 80° C.

11. An adhesive composition comprising an adhesive film-forming material selected from the group consisting of water-soluble amylaceous materials, water-soluble proteinaceous materials and alkali-soluble proteinaceous materials, and, as a plasticizer, a polymerized monocyclic terpene having a melting point up to about 80° C.

12. An adhesive composition comprising an adhesive film-forming material selected from the group consisting of water-soluble amylaceous materials, water-soluble proteinaceous materials and alkali-soluble proteinaceous materials, and, as a plasticizer, a polymerized acyclic terpene having a melting point up to about 80° C.

13. An adhesive composition comprising corn starch and, as a plasticizer, a polymerized dipentene having a melting point up to about 80° C.

14. An adhesive composition comprising animal glue and, as a plasticizer, a polymerized allo-ocimene having a melting point up to about 80° C.

MALCOLM C. MOORE.